United States Patent
Bai

(10) Patent No.: US 10,824,299 B2
(45) Date of Patent: Nov. 3, 2020

(54) APPLICATION DISPLAY METHOD AND RELATED PRODUCTS

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 61 days.

(21) Appl. No.: 15/970,913

(22) Filed: May 4, 2018

(65) Prior Publication Data

US 2018/0348971 A1 Dec. 6, 2018

(30) Foreign Application Priority Data

May 31, 2017 (CN) .......................... 2017 1 0402403

(51) Int. Cl.
| | | |
|---|---|---|
| *G06F 3/0482* | (2013.01) | |
| *G06F 3/0488* | (2013.01) | |
| *G06F 3/0481* | (2013.01) | |
| *G06F 3/0484* | (2013.01) | |

(52) U.S. Cl.
CPC .......... *G06F 3/0482* (2013.01); *G06F 3/0481* (2013.01); *G06F 3/0484* (2013.01); *G06F 3/04817* (2013.01); *G06F 3/04883* (2013.01)

(58) Field of Classification Search
CPC .. G06F 3/0482; G06F 3/0481; G06F 3/04883; G06F 3/0484; G06F 3/04817
See application file for complete search history.

(56) References Cited

U.S. PATENT DOCUMENTS

| | | | |
|---|---|---|---|
| 2010/0001967 A1* | 1/2010 | Yoo ..................... | G06F 3/04842 345/173 |
| 2012/0015693 A1* | 1/2012 | Choi ..................... | G06F 3/0484 455/566 |
| 2012/0185803 A1* | 7/2012 | Wang .................... | G06F 3/0488 715/847 |
| 2013/0069893 A1* | 3/2013 | Brinda ................ | G06F 3/04886 345/173 |
| 2013/0187753 A1* | 7/2013 | Chiriyankandath .. | G06F 3/0488 340/5.51 |

(Continued)

FOREIGN PATENT DOCUMENTS

| | | |
|---|---|---|
| CN | 102075619 A | 5/2011 |
| CN | 102841753 A | 12/2012 |

(Continued)

OTHER PUBLICATIONS

Extended European search report issued in corresponding European application No. 18168682.5 dated Oct. 22, 2018.

(Continued)

*Primary Examiner* — Phenuel S Salomon

(57) ABSTRACT

An application display method, an apparatus, and a computer readable storage medium are provided. At least one high-frequency application is determined; an application icon of the at least one high-frequency application is displayed on a lock-screen interface. The apparatus includes a processor and a communication unit coupled with the processor.

15 Claims, 5 Drawing Sheets

(56) References Cited

U.S. PATENT DOCUMENTS

| | | | |
|---|---|---|---|
| 2014/0109024 A1* | 4/2014 | Miyazaki | G06F 3/04883 715/863 |
| 2014/0181964 A1* | 6/2014 | Park | G06F 21/6209 726/19 |
| 2014/0201655 A1 | 7/2014 | Mahaffey et al. | |
| 2014/0283142 A1* | 9/2014 | Shepherd | G06F 3/0482 726/30 |
| 2014/0325433 A1 | 10/2014 | Hiroura | |
| 2015/0033361 A1* | 1/2015 | Choi | G06F 21/316 726/27 |
| 2015/0087266 A1* | 3/2015 | Nakazawa | G06F 3/0483 455/411 |
| 2015/0193129 A1* | 7/2015 | Cho | G06F 3/0482 715/739 |
| 2015/0370438 A1* | 12/2015 | Ito | H04N 1/4433 715/750 |
| 2016/0252944 A1* | 9/2016 | Kim | G06F 1/28 713/340 |
| 2016/0314308 A1* | 10/2016 | Suzuki | H04M 1/72577 |
| 2018/0048752 A1* | 2/2018 | Zhou | H04M 1/67 |
| 2018/0067755 A1* | 3/2018 | Rhee | G06F 21/629 |
| 2018/0335921 A1* | 11/2018 | Karunamuni | G06F 3/0488 |

FOREIGN PATENT DOCUMENTS

| | | |
|---|---|---|
| CN | 103530115 A | 1/2014 |
| CN | 103761109 A | 4/2014 |
| CN | 103914231 A | 7/2014 |
| CN | 104063237 A | 9/2014 |
| CN | 104317484 A | 1/2015 |
| CN | 104331220 A | 2/2015 |
| CN | 104331237 A | 2/2015 |
| CN | 105573761 A | 5/2016 |
| CN | 105740669 A | 7/2016 |
| CN | 106200970 A | 12/2016 |
| CN | 106201161 A | 12/2016 |
| EP | 2565763 A1 | 3/2013 |
| EP | 2570909 A1 | 3/2013 |
| EP | 3200145 A1 | 8/2017 |
| EP | 3270279 A1 | 1/2018 |
| JP | 2013041378 A | 2/2013 |
| JP | 2013134694 A | 7/2013 |
| JP | 2014099071 A | 5/2014 |
| JP | 2014215737 A | 11/2014 |
| WO | 2014093105 A1 | 6/2014 |
| WO | 2015190289 A1 | 12/2015 |
| WO | 2016176834 A1 | 11/2016 |
| WO | 2017063146 A1 | 4/2017 |

OTHER PUBLICATIONS

International search report issued in corresponding international application No. PCT/CN2018/083571 dated Jul. 25, 2018.
Summons to Oral Proceedings issued in corresponding European Application No. 18168682.5 dated Feb. 24, 2020.
Brief Communication issued in corresponding European Application No. 18168682.5 dated Jul. 20, 2020.
Search Report issued in corresponding Singapore Application No. 11201904766V dated Jul. 20, 2020.
Written Opinion issued in corresponding Singapore Application No. 11201904766V dated Jul. 20, 2020.
Examination report No. 2 issued in corresponding Australian Application No. 2018275436 dated Jun. 2, 2020.
Examination report No. 3 issued in corresponding Australian Application No.2018275436 dated Aug. 19, 2020.
English translation of the OA issued in corresponding JP application No. 2019-536905 dated Sep. 4, 2020.
Communication from IP Office after case abandoned issued in corresponding European application No. 18168682.5 dated Sep. 8, 2020.

* cited by examiner

APPLICATION DISPLAY METHOD AND RELATED PRODUCTS

CROSS-REFERENCE TO RELATED APPLICATION(S)

This application claims priority to Chinese Patent Application No. 201710402403.2, filed on May 31, 2017, the disclosure of which is hereby incorporated by reference in its entirety.

TECHNICAL FIELD

The present disclosure relates to the field of mobile terminals, and more particularly to an application display method and related products.

BACKGROUND

With rapid development of smart phones, a large number of applications are emerging. When using a mobile phone, users can install various applications on the mobile phone according to actual needs. With the increase in applications installed, users can store these applications through a number of pagination or application folders.

Currently, a user needs to find a particular application from among a large number of applications by sliding pages and other operations. However, a larger number of pages and application folders make it necessary for the user to slide multiple times to find the application required, which can be complicated and time-consuming, therefore affecting the user experience.

SUMMARY

Implementations of the present disclosure provide an application display method and related products, to improve the convenience and intelligence of display of mobile terminal applications.

According to a first aspect of implementations of the present disclosure, there is provided an application display method. The method may include the following.

At least one high-frequency application is determined.

An application icon of the at least one high-frequency application is displayed on a lock-screen interface.

According to a second aspect of implementations of the present disclosure, there is provided an application display device. The application display device has functions of implementing operations of the mobile terminal in the above method. The functions can be realized through hardware, and can also be realized through implementing corresponding software with hardware. The above hardware or software may include one or more modules corresponding to the functions.

According to a third aspect of implementations of the present disclosure, there is provided a mobile terminal. The mobile terminal may include a processor, a memory, and one or more programs. The one or more programs are stored in the memory and configured to be executed by the processor. The one or more programs include instructions being operable with the processor to perform operations in any method of the first aspect of the implementations of the present disclosure.

According to a fourth aspect of implementations of the present disclosure, there is provided a computer readable storage medium. The computer readable storage medium is configured to store computer programs for electronic data interchange. The computer programs include instructions being operable to perform all or part of the operations described in any method of the first aspect of the implementations of the present disclosure. The computer includes a mobile terminal.

According to a fifth aspect of implementations of the present disclosure, there is provided a computer program product. The computer program product includes a non-volatile computer readable storage medium. The computer programs are operable with a computer to perform all or part of the operations described in any method of the first aspect of the implementations of the present disclosure. The computer program product may be a software installation package. The computer includes a mobile terminal.

BRIEF DESCRIPTION OF THE DRAWINGS

In order to illustrate the technical solutions of the implementations of the present disclosure or the related art more clearly, the drawings used in the description of the implementations or the related art will be briefly described. It will be apparent that the drawings described in the following are merely implementations of the present disclosure, and it will be apparent to those skilled in the art that other drawings can be obtained from the drawings without creative efforts.

DETAILED DESCRIPTION

Figure 1:
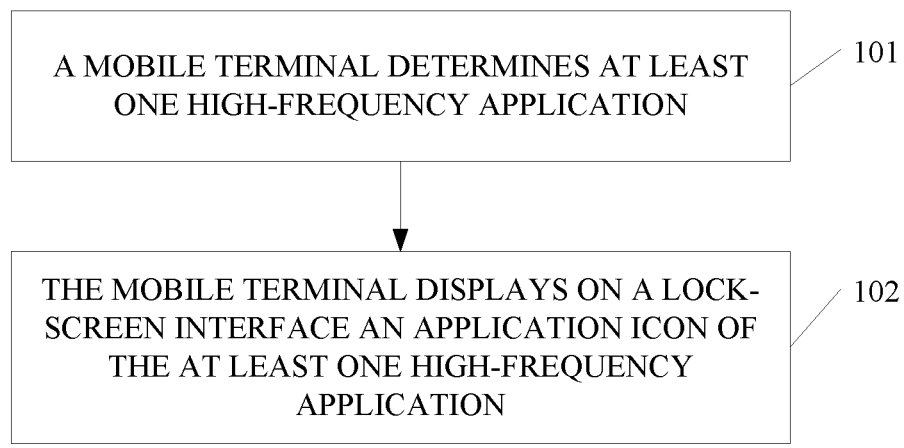
FIG. 1 is schematic flow diagram illustrating an application display method according to an implementation of the present disclosure.

In order to make those skilled in the art better understand the solution of the present disclosure, hereinafter, technical solutions embodied by the implementations of the disclosure will be described in a clear and comprehensive manner with reference to the accompanying drawings intended for the implementations. It is evident that the implementations described herein constitute merely some rather than all of the implementations of the disclosure, and those of ordinary skill in the art will be able to derive other implementations based on these implementations without making inventive efforts, with all such derived implementations shall all fall in the protection scope of the disclosure.

The terms "first" and "second" appearing in the specification, the claims, and the accompanying drawings of the present disclosure are intended for distinguishing different objects rather than describing a particular order. In addition, the terms "include", "comprise", "have" and any variations thereof are intended to cover a non-exclusive inclusion. For example, a process, method, system, product, or apparatus including a series of steps or units, is not limited to the listed steps or units, it can optionally include other steps or units that are not listed; alternatively, other steps or units inherent to the process, method, product, or device can be included either.

The term "embodiment", "example", or "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

The "mobile terminal" involved in the implementations of the present disclosure may include various handheld devices having wireless communication functions, in-vehicle devices, wearable devices, computing devices or other processing devices connected to the wireless modem, as well as various forms of user equipment (UE), Mobile Station (MS), terminal device, and the like. For the convenience of description, the above-mentioned devices are collectively referred to as a mobile terminal. The implementations of the present disclosure are described in detail below.

Implementations of the disclosure provide an application display method. In this application display method, at least one high-frequency application is determined, and an application icon of the at least one high-frequency application is displayed on a lock-screen interface.

Implementations of the disclosure provide a terminal. The terminal includes a processor and a memory storing one or more programs. The one or more programs, when executed by the processor, are operable with the processor to perform the operations of the application display method.

Implementations of the disclosure provide an application display device. The application display device includes a processing unit (for example, processor) and a communication unit coupled with the processing unit. The processing unit determines at least one high-frequency application and displays on a lock-screen interface an application icon of the at least one high-frequency application via the communication unit.

The at least one high-frequency application may include one high-frequency application or a plurality of high-frequency applications. An application icon of an application may be one icon or a set of icons. A parameter of an icon may be one parameter or a set of parameters.

FIG. 1 is a schematic flow chart illustrating an application display method according to an implementation of the present disclosure. The application display method illustrated in FIG. 1 may begin at block 101.

At block 101, a mobile terminal determines at least one high-frequency application.

It can be understood that the manner in which the at least one high-frequency application is determined is various, and the implementations of the present disclosure are not particularly limited thereto.

As an example, determining the at least one high-frequency application can be achieved as follows.

A plurality of application usage records is obtained and each application usage record is a usage record corresponding to an application that is first enabled after the mobile terminal is successfully unlocked. At least one application with a usage frequency higher than a preset threshold is determined to be the at least one high-frequency application from among the plurality of application usage records.

Each of the plurality of the application usage records is a usage record of an application enabled after the mobile terminal is unlocked successfully, and the records are stored in a memory.

As can be seen, in this example, mobile terminals can determine independently, from among the plurality of application usage records, at least one application with the usage frequency greater than the preset threshold to be the at least one high-frequency application through intelligent learning user habits, which is conducive to improving the intelligence of the mobile terminal.

As another example, determining the at least one high-frequency application can be achieved as follows.

The at least one high-frequency application is determined according to a current position and a current time. The at least one high-frequency application refers to at least one application that matches with the current position and the current time and has a usage frequency greater than a preset frequency threshold among historical enabled applications.

For example, the current position is a subway station A and the current time is a time period from 7 am to 8 am. At least one application that has a usage history matching with the position of the subway station A and the time period from 7 am to 8 am and has the usage frequency greater than the preset frequency threshold among historical enabled applications is determined to be the at least one high-frequency application.

As can be seen, in this example, according to the current position and the current time, the mobile terminal can conduct data learning on user habits to determine the at least one high-frequency application, which can improve display adaptability and display intelligence of applications of the mobile terminal.

At block 102, the mobile terminal displays on a lock-screen interface an application icon of the at least one high-frequency application.

In this implementation of the present disclosure, the mobile terminal first determines the at least one high-frequency application, and then displays the application icon of the at least one high-frequency application on the lock-screen interface. As can be seen, the mobile terminal determines the at least one high-frequency application independently and does not need to determine the application according to the user's selection, which can be beneficial to enhance the intelligence of the mobile terminal. In addition, displaying on the lock-screen interface the application icon of the at least one high-frequency application can help to improve the convenience of the mobile terminal.

Implementation 1

In a possible example, the at least one high-frequency application includes one high-frequency application, and displaying on the lock-screen interface the application icon of the at least one high-frequency application may include the following.

A first application icon and a second application icon of the high-frequency application are displayed on the lock-screen interface, and the first application icon has display parameters different from that of the second application icon.

The display parameter above may include at least one of the size of an application icon, the color depth, the width of the application icon edge, the shape, and the like.

As can be seen, in this example, the mobile terminal displays on the lock-screen interface two different application icons of the high-frequency application, which can provide the user with multiple options and therefore can meet user's demands; further, it is helpful to improve the convenience of the mobile terminal and improve user engagement.

In this possible example, after displaying an application icon(s) of the at least one high-frequency application on a lock-screen interface, the method may further include the following.

Detection of a selection operation against the first application icon and the second application icon is conducted within a preset time period.

When the selection operation against the first application icon is detected or no selection operation against the first application icon and the second application icon is detected, after an authentication for unlocking is successful, the mobile terminal exits the lock-screen interface (in other words, the lock-screen interface is removed or closed) and displays an application interface of the high-frequency application. Optionally, the mobile terminal may exit the lock-screen interface and display an application interface of the high-frequency application directly.

When the selection operation against the second application icon is detected, after the authentication for unlocking is successful, the mobile terminal exits the lock-screen interface and displays a display interface in a screen-off state. Optionally, the mobile terminal may exit the lock-screen interface and display a display interface in a screen-off state directly without unlocking authentication.

When the selection operation against the first application icon is detected or no selection operation against the first application icon and the second application icon is detected, the high-frequency application can be started in the background, once the authentication for unlocking is successful, the mobile terminal exits the lock-screen interface and displays the application interface of the high-frequency application directly, thereby reducing time consumption.

When the selection operation against the second application icon is detected, it means that the user does not need to start the high-frequency application. In this situation, after exiting the lock-screen interface, the mobile terminal will stay in the display interface in the screen-off state and will not start the high-frequency application. The display interface in the screen-off state can be a system desktop or an interface of an application, which is not limited herein.

As can be seen, in this example, when the selection operation against the first application icon is detected by the mobile terminal or when no selection operation against the first application icon and the second application icon is detected, the selected application is started in the background. When the authentication for unlocking is successful and the mobile terminal exits the lock-screen interface, the application interface of the high-frequency application will be displayed directly, which can help improve the response speed of the mobile terminal. Moreover, when the selection operation against the second application icon is detected, after the authentication for unlocking is successful, the mobile terminal exits the lock-screen interface and displays the display interface in the screen-off state. It is possible to avoid an unreasonable behavior that user will not choose the high-frequency application because the determined high-frequency application is not the one currently in user's demand, which can further improve the application display strategy of the mobile terminal.

Implementation 2

In an example, the at least one high-frequency application includes one high-frequency application, and displaying on the lock-screen interface the application icon of the at least one high-frequency application may include the following.

The application icon of the at least one high-frequency application is displayed on the lock-screen interface transparently.

The manner in which the application icon of the at least one high-frequency application is transparently displayed on the lock-screen interface is as follows. The application icon of the at least one high-frequency application is transparently displayed on the lock-screen through setting the transparency of the application icon of the at least one high-frequency application.

As can be seen, in this example, the mobile terminal transparently displays on the lock-screen interface, the application icon of the at least one high-frequency application, thereby avoiding others from understanding the user's habits when using the user's mobile terminal, protecting the privacy of the user, and improving the security of the mobile terminal.

In one example, after the application icon of the at least one high-frequency application is transparently displayed on the lock-screen interface, the method may further include the following.

When a first return operation against the high-frequency application is detected, a plurality of usage records is obtained, and each usage record is a usage record corresponding to an application that is first enabled after the mobile terminal exits the high-frequency application. From among the plurality of application usage records, an application with a usage frequency greater than a preset threshold is determined to be a target high-frequency application. An application interface of the target high-frequency application is displayed.

As can be seen, in this example, when the first return operation is detected, the mobile terminal displays the target high-frequency application rather than returning to the system desktop, which is consistent with the manner in which the user's habit of browsing multiple applications, thereby avoiding cumbersome operations where the user needs to return to the system desktop, search for the target high-frequency application, and click the target high-frequency application, therefore, it is possible to improve usage efficiency of the mobile terminal and further enhance the intelligence of the mobile terminal.

In another example, after the application icon of the at least one high-frequency application is displayed on the lock-screen interface transparently, the method may further include the following.

When a second return operation against the high-frequency application is detected, return to the system desktop.

The first return operation is different from the second return operation. The first return operation may be an operation of quitting the high-frequency application. The second return operation may be an operation for exiting the high-frequency application to enter the system desktop, such as a clicking operation on an added floating button, a long-press operation on a screen, a double-click operation on a home button, or other operations.

As can be seen, in this example, when the second return operation is detected, the mobile terminal returns to the system desktop directly, which can provide the user with intelligence and multiple options, thereby avoiding that the user must review the applications because the high-frequency application obtained by learning user habits is not the one currently in user's demand, and further improving the application control strategy of the mobile terminal.

Implementation 3

In an example, the at least one high-frequency application includes a plurality of high-frequency applications. Here, displaying on the lock-screen interface the application icon of the at least one high-frequency application may include the following.

A display parameter of each of the plurality of high-frequency applications is determined according to a usage parameter of each of the plurality of high-frequency applications. Application icons of the plurality of high-frequency applications are displayed on the lock-screen interface differentially according to the display parameter of each of the plurality of high-frequency applications.

The above usage parameter may include usage frequency, usage time, usage location, and the like.

Displaying differentially refers to setting application-icon display parameters for the plurality of high-frequency applications in view of the different usage parameters of the plurality of high-frequency applications.

For example, the plurality of high-frequency applications includes App 1, App 2, and App 3. App 1 is determined to be a high-frequency application that has the highest usage frequency and matches with the current time and current position. App 2 is a high-frequency application with the lowest usage frequency. Based on this, an application icon of App 1 can be set to a larger icon, an application icon of App 3 can be set to a normal size icon, and an application icon of App 2 can be set to a smaller icon.

As can be seen, in this example, considering the usage habit of the user, the mobile terminal differentially displays the application icons of the plurality of high-frequency applications on the lock-screen interface according to the usage parameter of each of the plurality of high-frequency applications, which allows the user to see the required application more quickly, and it is possible to further enhance the convenience of the mobile terminal and improve user engagement.

In this example, after the application icon of the at least one high-frequency application is displayed on the lock-screen interface, the method may further include the following.

Detection of selection operations against the plurality of high-frequency applications is conducted within the preset time period.

When selection operations against at least two high-frequency applications among the plurality of high-frequency applications are detected, after the authentication for unlocking is successful, the mobile terminal exits the lock-screen interface and displays in split-screen application interfaces of the at least two high-frequency applications.

When no selection operation against the plurality of high-frequency applications is detected, after the authentication for unlocking is successful, the mobile terminal exits the lock-screen interface and displays the display interface in the screen-off state.

When the selection operations against the plurality of high-frequency applications are detected, the at least two high-frequency applications can be started in the background. When the authentication for unlocking is successful and the mobile terminal exits the lock-screen interface, the application interfaces of the at least two high-frequency applications is displayed in split-screen, thereby reducing the time consumption.

The split-screen display can be up and down split-screen display, left and right split-screen display, separate area display, and the like. The screen can be split equally or unequally. The manner of split-screen display may be set in the system of the mobile terminal in advance by developers before the mobile terminal leaves the factory or may be set by the user during usage through a menu provided by the mobile terminal. The present disclosure is not limited thereto. For example, the at least two high-frequency applications are App 1 and App 2 and the manner of display is displaying in a left and right split-screen. In this situation, an application interface of App 1 can be displayed on the left screen and an application interface of App 2 can be displayed on the right screen. The user may change the size of the left and right display areas by sliding a middle line for splitting the screen.

When no selection operation against the plurality of high-frequency applications is detected, it indicates that the user does not need to enable these high-frequency applications. In this case, after the authentication for unlocking is successful, the lock-screen interface is removed and the mobile terminal stays in the display interface in the screen-off state. The display interface in the screen-off state can be a system desktop or an interface of some application, which is not limited herein.

As can be seen, in this example, when the selection operations against the at least two high-frequency applications among the plurality of high-frequency applications are detected, the mobile terminal can enable the at least two high-frequency applications in the background, and after the authentication for unlocking is successful, the mobile terminal will exit the lock-screen interface and display in split-screen the application interfaces of the at least two high-frequency applications, which is conducive to improving the response speed of the mobile terminal and improving the convenience of the mobile terminal. Moreover, when no selection operation against the multiple high-frequency applications is detected, after the authentication for unlocking is successful, the mobile terminal will exit the lock-screen interface and display the display interface in the screen-off state, thereby avoiding that user made no selection because the determined high-frequency application is not the one currently in demand of the user, further improving the display strategy of applications of the mobile terminal.

Figure 2:
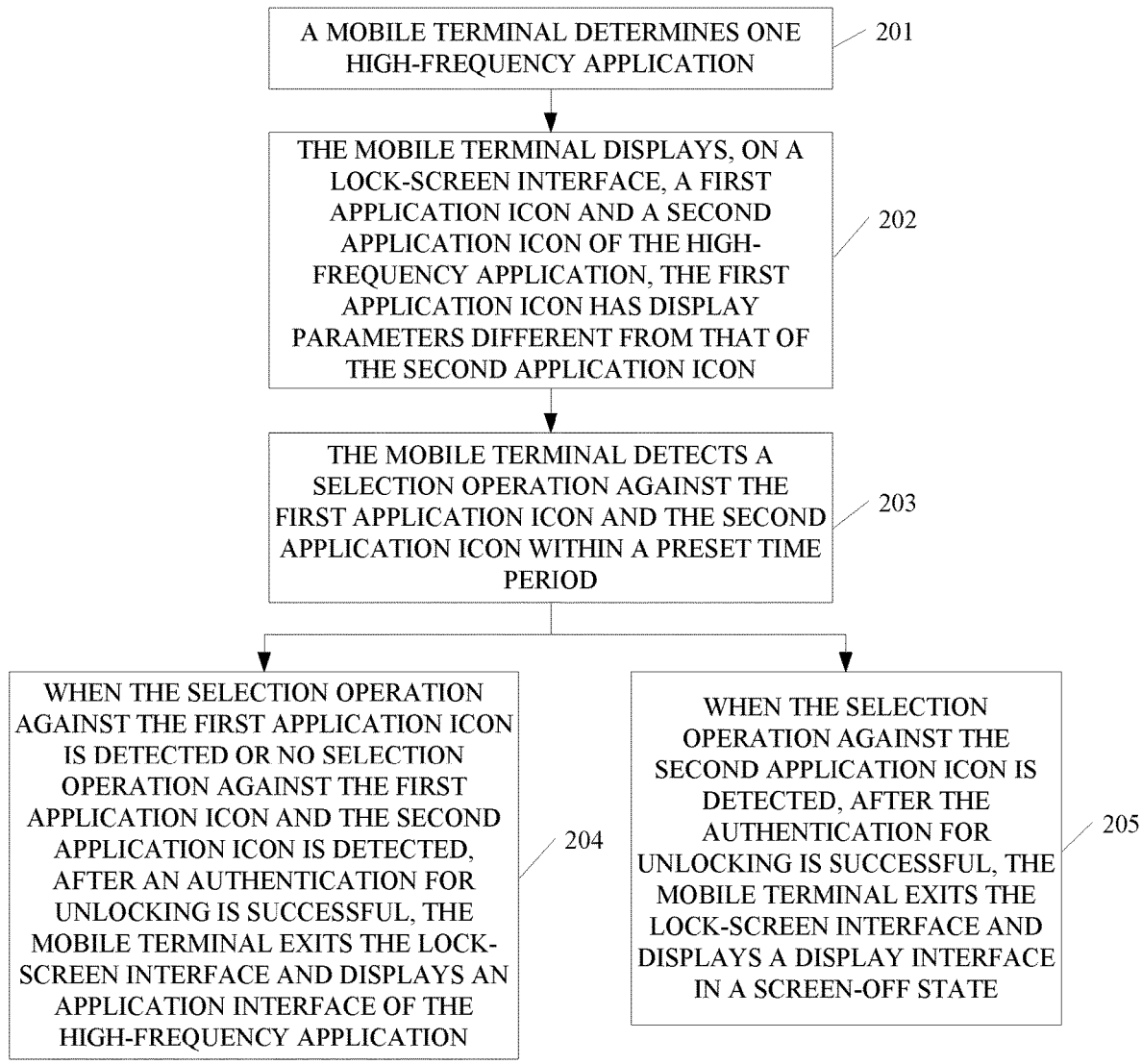
FIG. 2 is schematic flow diagram illustrating another application display method according to an implementation of the present disclosure.

FIG. 2 is schematic flow diagram illustrating another application display method according to an implementation of the present disclosure. The application display method illustrated in FIG. 2 may begin at block 201.

At block 201, a mobile terminal determines one high-frequency application.

At block 202, the mobile terminal displays, on a lock-screen interface, a first application icon and a second application icon of the high-frequency application. The first application icon has display parameters different from that of the second application icon.

The display parameter may include the size of an application icon, the color depth, the width of the application icon edge, the shape, and the like.

At block 203, the mobile terminal detects a selection operation against the first application icon and the second application icon within a preset time period.

At block 204, when the selection operation against the first application icon is detected or no selection operation against the first application icon and the second application icon is detected, after an authentication for unlocking is successful, the mobile terminal exits the lock-screen interface and displays an application interface of the high-frequency application.

At block 205, when the selection operation against the second application icon is detected, after the authentication for unlocking is successful, the mobile terminal exits the lock-screen interface and displays a display interface in a screen-off state.

For operations at block 201, reference can be made to the corresponding operations in the implementation described in conjunction with in FIG. 1.

In the implementation of the present disclosure, the mobile terminal first determines the high-frequency application. Then the mobile terminal displays the first application icon and the second application icon of the high-frequency application on the lock-screen interface, and the first application icon has display parameters different from that of the second application icon. Finally, the mobile terminal detects the selection operation against the first application icon and the second application icon within the preset time period; when the selection operation against the first application icon is detected or no selection operation against the first application icon and the second application icon is detected, after the authentication for unlocking is successful, the mobile terminal exits the lock-screen interface and displays the application interface of the high-frequency application; when the selection operation against the second application icon is detected, after the authentication for unlocking is successful, the mobile terminal exits the lock-screen interface and displays the display interface in the screen-off state. In this way, the mobile terminal can determine the high-frequency application independently without relying on the user's selection, which can be beneficial to enhance the intelligence of the mobile terminal; moreover, displaying on the lock-screen interface two different application icons of the high-frequency application can help to improve the convenience of the mobile terminal. In addition, when the selection operation against the first application icon is detected or no selection operation against the first application icon and the second application icon is detected, the high-frequency application can be enabled in the background; after the authentication for unlocking is successful, the mobile terminal exits the lock-screen interface and displays the application interface of the high-frequency application directly, which is conducive to improving the response speed of the mobile terminal. Moreover, when the selection operation against the second application icon is detected, after the authentication for unlocking is successful, the mobile terminal exits the lock-screen interface and displays the display interface in the screen-off state, thereby avoiding that user made no selection because the determined high-frequency application is not the one currently in demand of the user, which can further improve the display strategy of applications of the mobile terminal.

Figure 3:
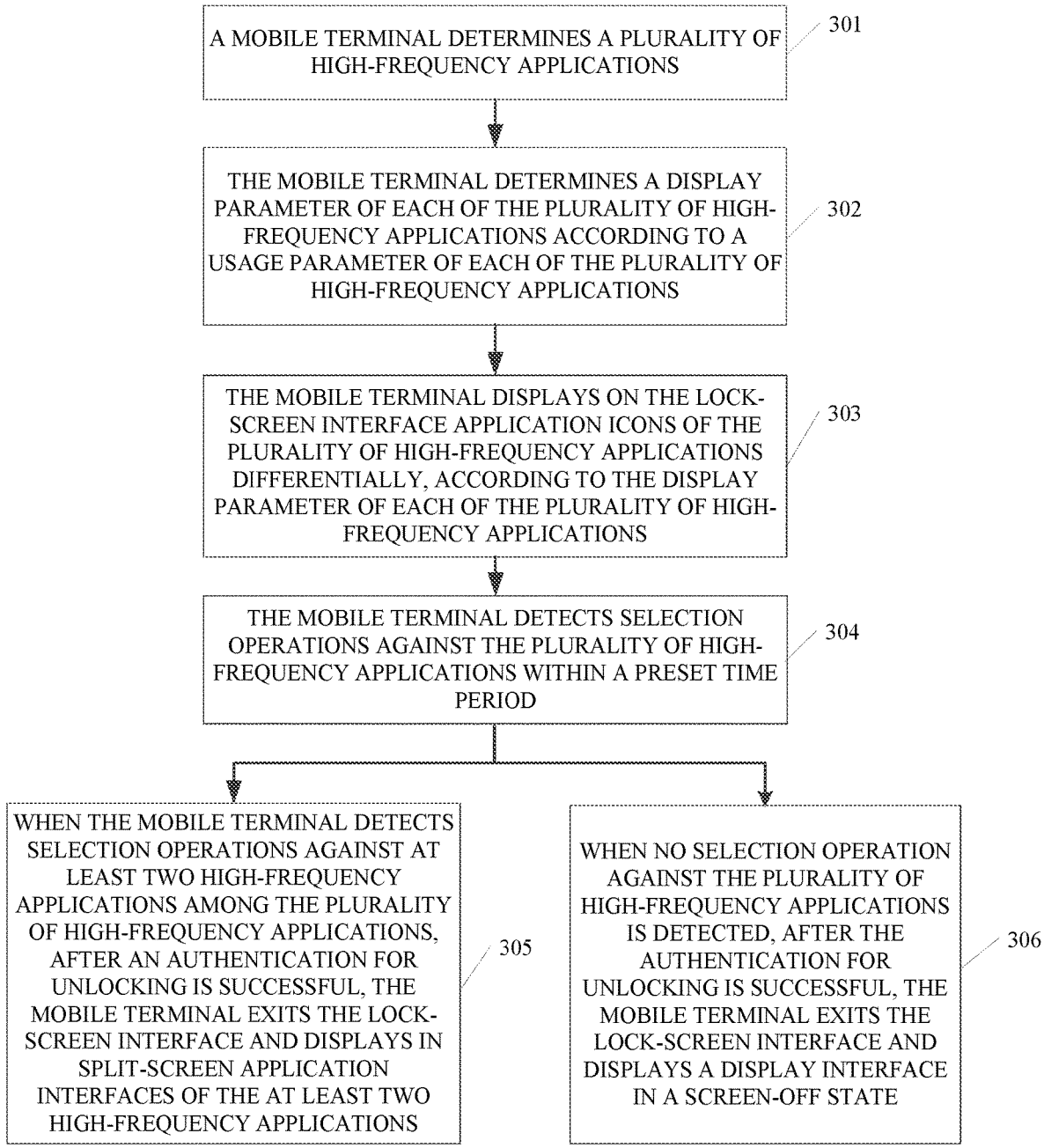
FIG. 3 is schematic flow diagram illustrating yet another application display method according to an implementation of the present disclosure.

FIG. 3 is schematic flow diagram illustrating yet another application display method according to an implementation of the present disclosure. The application display method illustrated in FIG. 3 may begin at block 301.

At block 301, a mobile terminal determines a plurality of high-frequency applications.

At block 302, the mobile terminal determines a display parameter of each of the plurality of high-frequency applications according to a usage parameter of each of the plurality of high-frequency applications.

The display parameter may include at least one of the size of an application icon, the color depth, the width of the application icon edge, the shape, and the like.

The usage parameter may include usage frequency, usage time, usage location, and the like.

At block 303, the mobile terminal displays on the lock-screen interface application icons of the plurality of high-frequency applications differentially, according to the display parameter of each of the plurality of high-frequency applications.

At block 304, the mobile terminal detects selection operations against the plurality of high-frequency applications within a preset time period.

At block 305, when the mobile terminal detects selection operations against at least two high-frequency applications among the plurality of high-frequency applications, after an authentication for unlocking is successful, the mobile terminal exits the lock-screen interface and displays in split-screen application interfaces of the at least two high-frequency applications.

The split-screen display can be up and down split-screen display, left and right split-screen display, separate area display, and the like. The screen can be split equally or unequally. The manner of split-screen display may be set in the system of the mobile terminal in advance by developers before the mobile terminal leaves the factory or may be set by the user during usage through a menu provided by the mobile terminal. The present disclosure is not limited thereto. For example, the at least two high-frequency applications are App 1 and App 2 and the manner of display is displaying in a left and right split-screen. In this situation, an application interface of App 1 can be displayed on the left screen and an application interface of App 2 can be displayed on the right screen. The user may change the size of the left and right display areas by sliding a middle line for splitting the screen.

At block 306, when no selection operation against the plurality of high-frequency applications is detected, after the authentication for unlocking is successful, the mobile terminal exits the lock-screen interface and displays a display interface in a screen-off state.

For operations at block 301, reference can be made to the corresponding operations of the implementation described in conjunction with FIG. 1.

In the implementation of the present disclosure, the mobile terminal first determines the plurality of high-frequency applications. Then the mobile terminal determines a display parameter of each of the plurality of high-frequency applications according to the usage parameter of each of the plurality of high-frequency applications, and displays the application icons of the plurality of high-frequency applications on the lock-screen interface differentially, according to the display parameter of each of the plurality of high-frequency applications. Finally, the mobile terminal detects the selection operations against the plurality of high-frequency applications within the preset time period; when the selection operations against the at least two high-frequency applications among the plurality of high-frequency applications are detected, after the authentication for unlocking is successful, the mobile terminal exits the lock-screen interface and displays the application interfaces of the at least two high-frequency applications; when no selection operation against the plurality of high-frequency applications is detected, after the authentication for unlocking is successful, the mobile terminal exits the lock-screen interface and displays the display interface in the screen-off state. In this way, the mobile terminal can determine the plurality of high-frequency applications independently without relying on the user's selection, which can be beneficial to enhance the intelligence of the mobile terminal; moreover, the application icons of the plurality of high-frequency applications are differentially displayed on the lock-screen interface according to the usage parameter of each of the plurality of high-frequency applications, and this can help to improve the convenience of the mobile terminal. In addition, when the selection operations against the at least two high-frequency applications among the plurality of high-frequency applications are detected, the at least two high-frequency applications are enabled in the background, and after the authentication for unlocking is successful, the mobile terminal can exit the lock-screen interface and display in split-screen the application interfaces of the at least two high-frequency applications, which is conducive to improving the response speed of the mobile terminal. Besides, split-screen display is conducive to enhancing the convenience of the mobile terminal. Moreover, when no selection operation against the plurality of high-frequency applications is detected, after the authentication for unlocking is successful, the mobile terminal will exit the lock-screen interface and display the display interface in the screen-off state, thereby avoiding that the user made no selection because the determined high-frequency application is not the one currently in demand of the user, which can further improve the display strategy of applications of the mobile terminal.

The foregoing technical solutions of the implementations of the disclosure are mainly described from the viewpoint of execution of the method. It can be understood that, in order to implement the above functions, the mobile terminal includes hardware structures and/or software modules corresponding to the respective functions. Those skilled in the art should readily recognize that, in combination with the exemplary units and scheme steps or operations described in the implementations disclosed herein, the present disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the mobile terminal in accordance with the foregoing method examples. For example, functional units may be divided according to corresponding functions, and two or more functions may be integrated into one processing unit. The above-mentioned integrated unit can be implemented in the form of hardware or software functional units. It should be noted that the division of units in the implementations of the present disclosure is schematic and is merely a logical function division; there may be other division manners in actual implementation.

Figure 4:
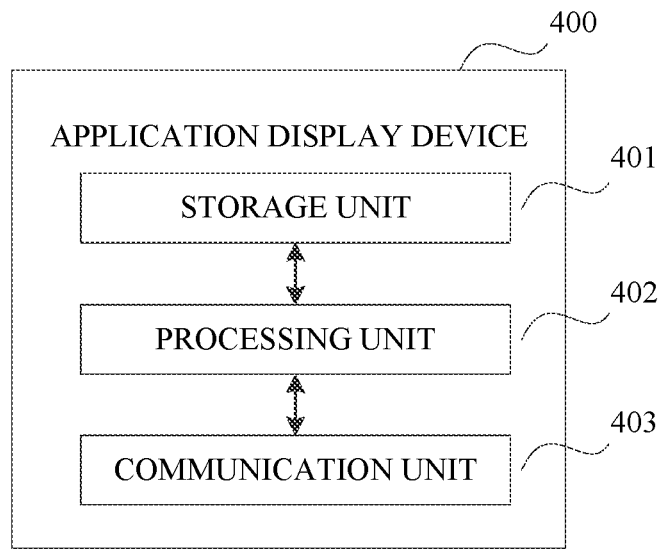
FIG. 4 is schematic structural diagram illustrating an application display device according to an implementation of the present disclosure.

In the case of integrated units, FIG. 4 is schematic structural diagram illustrating an application display device according to an implementation of the present disclosure. An application display device 400 includes a processing unit 402 and a communication unit 403. The processing unit 402 is configured to control and manage operations of the application display device. For example, the processing unit 402 is configured to support the application display device to perform operations at block 101 and block 102 illustrated in FIG. 1, operations at block 201~block 205 illustrated in FIG. 2, and operations at block 301~block 306 illustrated in FIG. 3 and/or other processes for the techniques described herein. The communication unit 403 is configured to support the communication between the application display device and other devices (such as a display screen), or to support the communication between the processing unit 402 and peripheral devices (such as camera devices, fingerprint recognition devices, etc.) of the application display device. The application display device 400 may further include a storage unit 401 configured to store program codes and data of the application display device.

The processing unit 402 may be a processor or a controller. For example, the processing unit 402 may be a central processing unit (CPU), a general-purpose processor, a digital signal processor (DSP), an application-specific integrated circuit (ASIC), a field programmable gate array (FPGA), or other programmable logic devices, transistor logic devices, hardware components, and any combination thereof. For example, the processor can be one of the cores of a general purpose processor of a SoC (System on Chip), a cluster of similar cores among the clusters of cores of the general purpose processor, a general purpose processor taken as a whole, a core of the CPU, a CPU taken as a whole, or a SoC taken as a whole. The processing unit 402 can implement or perform various exemplary logic blocks, modules, and circuits described in connection with the present disclosure. The processor can also be a set of computing functions, for example, a set of one or more microprocessors, a set of a DSP and a microprocessor, and the like. The communication unit 403 can be a transceiver, a transceiver circuit, an internal communication interface (a communication port between a processor and a peripheral device), and the like, and may include one or more interfaces. The storage unit 401 can be a memory.

The processing unit 402 is configured to determine at least one high-frequency application, and display on a lock-screen interface an application icon of the at least one high-frequency application via the communication unit 403.

In one example, the at least one high-frequency application includes one high-frequency application. In term of displaying on the lock-screen interface the application icon of the at least one high-frequency application via the communication unit, the processing unit 402 is configured to display on the lock-screen interface a first application icon and a second application icon of the high-frequency application via the communication unit 403. The first application icon has display parameters different from that of the second application icon.

In this example, after displaying the application icon of the at least one high-frequency application on the lock-screen interface via the communication unit, the processing unit 402 is further configured to: detect a selection operation against the first application icon and the second application icon within a preset time period; when the selection operation against the first application icon is detected or no selection operation against the first application icon and the second application icon is detected, after an authentication for unlocking is successful, close the lock-screen interface and display an application interface of the high-frequency application via the communication unit; when the selection operation against the second application icon is detected; after the authentication for unlocking is successful, close the lock-screen interface and display a display interface in a screen-off state via the communication unit 403.

In one example, the at least one high-frequency application includes one high-frequency application, and in term of displaying on the lock-screen interface the application icon of the at least one high-frequency application via the communication unit 403, the processing unit 402 is configured to: display on the lock-screen interface transparently the application icon of the at least one high-frequency application via the communication unit 403.

In an example, the at least one high-frequency application includes a plurality of high-frequency applications, and in term of displaying on the lock-screen interface the application icon of the at least one high-frequency application via the communication unit, the processing unit 402 is configured to: determine a display parameter of each of the plurality of high-frequency applications according to a usage parameter of each of the plurality of high-frequency applications; display on the lock-screen interface differentially application icons of the plurality of high-frequency applications via the communication unit 403, according to the display parameter of each of the plurality of high-frequency applications.

In this example, after displaying on the lock-screen interface the application icon of the at least one high-frequency application via the communication unit, the processing unit is further configured to: detect selection operations against the plurality of high-frequency applications within the preset time period; close the lock-screen interface when the authentication for unlocking is successful and display in split-screen application interfaces of at least two high-frequency applications among the plurality of high-frequency applications via the communication unit, when selection operations against the at least two high-frequency applications are detected; close the lock-screen interface when the authentication for unlocking is successful and display the display interface in the screen-off state via the communication unit, when no selection operation against the plurality of high-frequency applications is detected.

In an example, in term of determining the at least one high-frequency application, the processing unit is configured to: obtain a plurality of application usage records via the communication unit, with each application usage record being a usage record corresponding to an application that is first enabled after the mobile is successfully unlocked; determine, from among the plurality of application usage records, at least one application with a usage frequency higher than a preset threshold to be the at least one high-frequency application.

It should be understood that functions of program modules of the application display device 400 in this implementation can be implemented according to the methods in the foregoing method implementations. For details, reference may be made to the related descriptions in the foregoing method implementations, and it will not be described in further detail herein.

Figure 5:
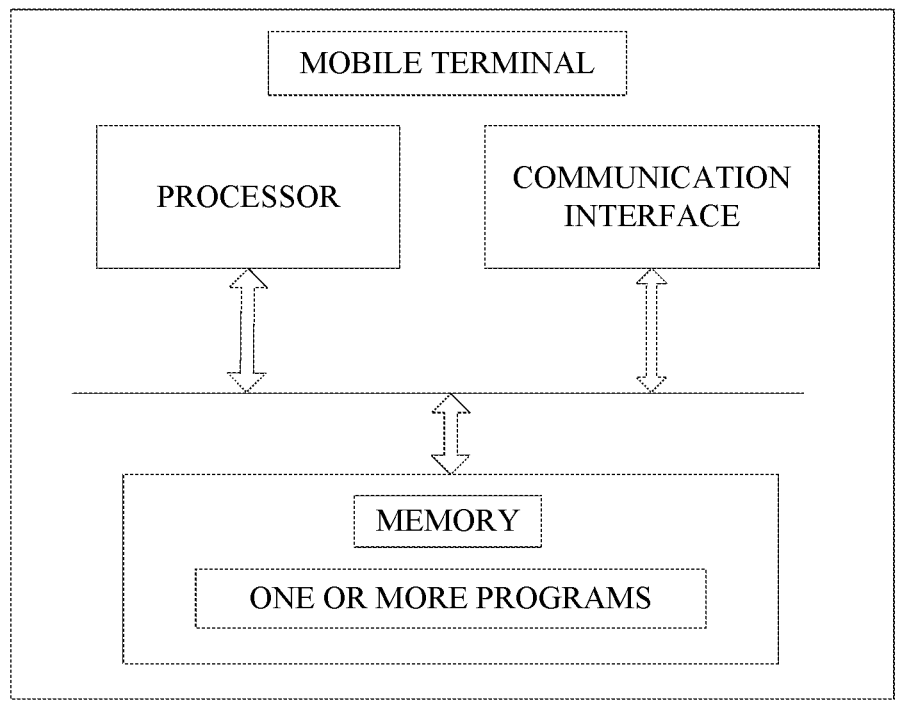
FIG. 5 is schematic structural diagram illustrating a mobile terminal according to an implementation of the present disclosure.

FIG. 5 is schematic structural diagram illustrating a mobile terminal according to an implementation of the present disclosure. The mobile terminal may include a processor, a memory, a communication interface, and one or more programs. The one or more programs are stored in the memory and include instructions, which when executed by the processor, are operable with the processor to perform the following operations.

At least one high-frequency application is determined.

An application icon of the at least one high-frequency application is displayed on a lock-screen interface.

In this implementation of the present disclosure, the mobile terminal first determines the at least one high-frequency application and then displays on the lock-screen interface the application icon of the at least one high-frequency application. As can be seen, the mobile terminal can determine the at least one high-frequency application independently without relying on the user's selection, which can be beneficial to enhance the intelligence of the mobile terminal. In addition, displaying on the lock-screen the application icon of the at least one high-frequency application can help to improve the convenience of the mobile terminal.

In an example, the at least one high-frequency application includes one high-frequency application, and in terms of displaying the application icon of the at least one high-frequency application on the lock-screen interface, the instructions of the above programs are operable with the processor to perform the following operations. A first application icon and a second application icon of the high-frequency application are displayed on the lock-screen interface, and the first application icon has display parameters different from that of the second application icon.

In this example, the above programs further include instructions for performing the following operations. After displaying on the lock-screen interface the application icon of the at least one high-frequency application, detect a selection operation against the first application icon and the second application icon within a preset time period; when the selection operation against the first application icon is detected or no selection operation against the first application icon and the second application icon is detected, after an authentication for unlocking is successful, exit the lock-screen interface and display an application interface of the high-frequency application; when the selection operation against the second application icon is detected, after the authentication for unlocking is successful, exit the lock-screen interface and display a display interface in a screen-off state.

In an example, the at least one high-frequency application includes one high-frequency application, and in term of displaying on the lock-screen interface the application icon of the at least one high-frequency application, the instructions of the above programs are operable with the processor to perform the following operations. The application icon of the at least one high-frequency application is displayed on the lock-screen interface transparently.

In an example, the at least one high-frequency application includes a plurality of high-frequency applications, and in term of displaying on the lock-screen interface the application icon of the at least one high-frequency application, the instructions of the above programs are operable with the processor to perform the following operations. A display parameter of each of the plurality of high-frequency applications is determined according to a usage parameter of each of the plurality of high-frequency applications; application icons of the plurality of high-frequency applications are displayed on the lock-screen interface differentially, according to the display parameter of each of the plurality of high-frequency applications.

In this example, the above programs further include instructions for performing the following operations. After displaying on the lock-screen interface the application icon of the at least one high-frequency application, detect selection operations against the plurality of high-frequency applications within the preset time period; when selection operations against at least two high-frequency applications among the plurality of high-frequency applications are detected, after the authentication for unlocking is successful, the lock-screen interface is closed and application interfaces of at least two high-frequency applications is displayed in split-screen; when no selection operation against the plurality of high-frequency applications is detected, after the authentication for unlocking is successful, the lock-screen interface is closed and the display interface in the screen-off state is displayed.

In a possible example, in terms of determining the at least one high-frequency application, the instructions of the above programs are configured to perform the following operations. A plurality of application usage records is obtained, and each application usage record is a usage record corresponding to an application that is first enabled after the mobile is successfully unlocked; at least one application with a usage frequency higher than a preset threshold is determined, from among the plurality of application usage records, to be the at least one high-frequency application.

Figure 6:
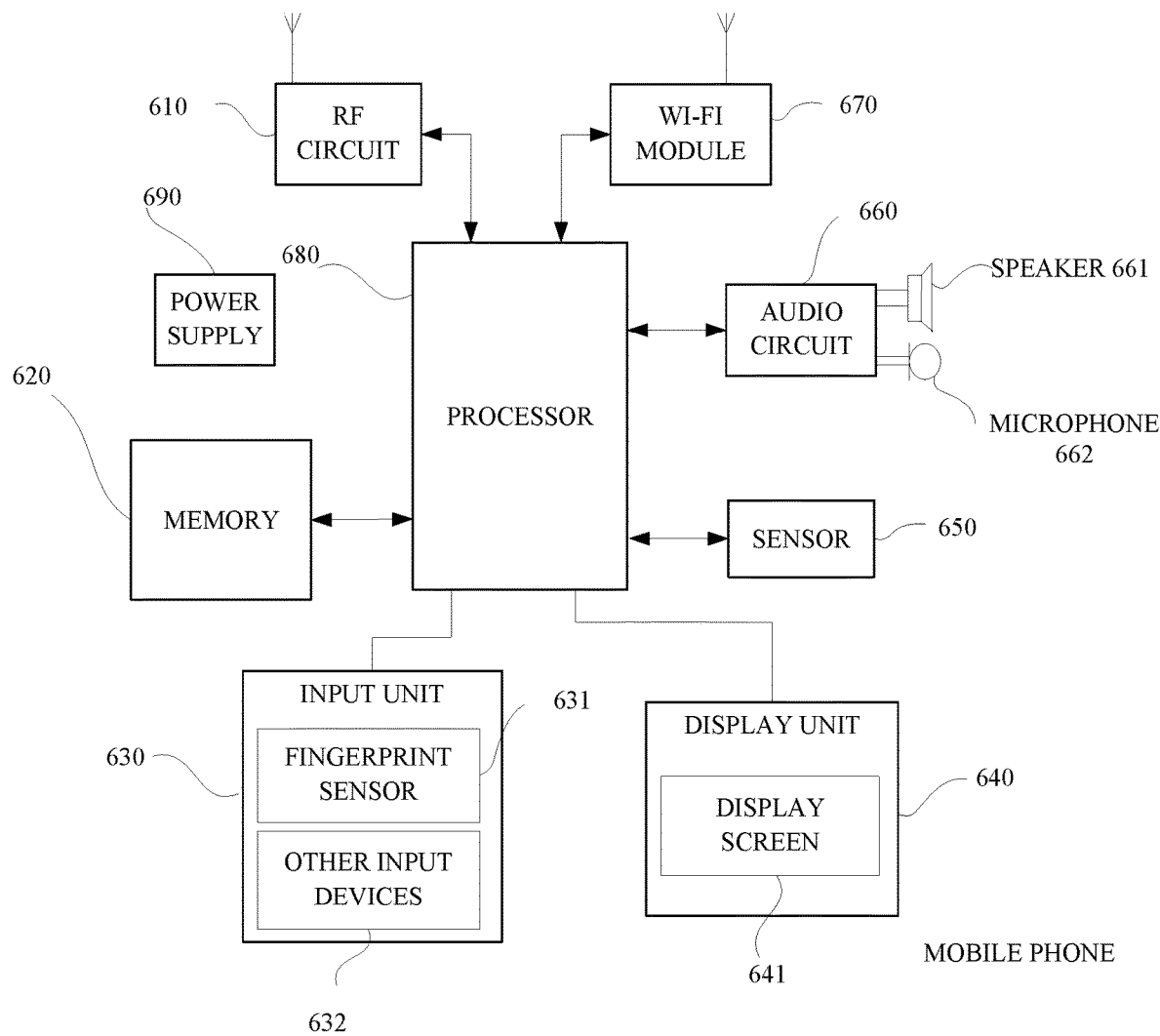
FIG. 6 is schematic structural diagram illustrating another mobile terminal according to an implementation of the present disclosure.

An implementation of the present disclosure further provides another mobile terminal. As illustrated in FIG. 6, only parts related to the implementations of the present disclosure are illustrated for ease of description. For technical details not described, reference may be made to the method implementations of the present disclosure. The mobile terminal may be any terminal device, such as a mobile phone, a tablet computer, a personal digital assistant (PDA), a point of sale terminal (POS), an on-board computer and the like. The following describes the mobile phone as an example of the mobile terminal.

FIG. 6 is a block diagram of a part of a structure of a mobile phone related to a mobile terminal according to an implementation of the present disclosure. As illustrated in FIG. 6, the mobile phone includes an RF (radio frequency) circuit 610, a memory 620, an input unit 630, a display unit 640, a sensor 650, an audio circuit 660, a Wi-Fi (wireless fidelity) module 670, a processor 680, a power supply 690 and other components. Those skilled in the art can understand that the structure of the mobile phone illustrated in FIG. 6 does not constitute any limitation on a mobile phone. The mobile phone configured to implement technical solutions of the disclosure may include more or fewer components than illustrated, or may combine certain components or different components.

In the following, various components of the mobile phone will be described in detail with reference to FIG. 6.

The RF circuit 610 is configured to transmit or receive information. Generally, the RF circuit 610 includes but is not limited to an antenna, at least one amplifier, a transceiver, a coupler, a low noise amplifier (LNA), a duplexer, and the like. In addition, the RF circuit 610 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 620 is configured to store software programs and modules, and the processor 680 is configured to execute various function applications and data processing of the mobile phone by running the software programs and the modules stored in the memory 620. The memory 620 mainly includes a program storage area and a data storage area. The program storage area may store an operating system, application programs required for at least one function and so on. The data storage area may store data (such usage parameters of an application) created according to use of the mobile phone, and so on. In addition, the memory 620 may include a high-speed RAM, and may further include a non-volatile memory such as at least one disk storage device, a flash device, or other non-volatile solid storage devices.

The input unit 630 is configured to receive input digital or character information and generate key signal input associated with user setting and function control of the mobile phone. As one implementation, the input unit 630 may include a fingerprint sensor 631 and other input devices 632. The fingerprint sensor 631 can collect fingerprint data of the user. In addition to the fingerprint sensor 631, the input unit 630 may further include other input devices 632. As one implementation, the other input devices 632 may include, but not limited to, one or more of a touch screen, a physical key, a function key (such as a volume control key, a switch key, etc.), a trackball, a mouse, a joystick and the like.

The display unit 640 is configured to display information input by the user or information provided for the user or various menus of the mobile phone. The display unit 640 may include a display screen 641, and alternatively, the display screen 641 may be in the form of a liquid crystal display (LCD), an organic light-emitting diode (OLED) and so on. Although the fingerprint sensor 631 and the display screen 641 are illustrated as two separate components in FIG. 6 to realize the input and output functions of the mobile phone, in some implementations, the fingerprint sensor 631 may be integrated with the display screen 641 to implement the input and output functions of the mobile phone.

The mobile phone may also include at least one sensor 650, such as a light sensor, a motion sensor, and other sensors. As one implementation, the light sensor may include an ambient light sensor and a proximity sensor, among which the ambient light sensor may adjust the brightness of the display screen 641 according to ambient lights, and the proximity sensor may turn off the display screen 641 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 660, the speaker 661, the microphone 662 may provide an audio interface between the user and the mobile phone. The audio circuit 660 may convert the received audio data into electrical signals and transfer the electrical signals to the speaker 661; thereafter the speaker 661 converts the electrical signals into sound signals to output. On the other hand, the microphone 662 converts the received sound signals into electrical signals, which will be received and converted into audio data by the audio circuit 660 to output. The audio data is then processed and transmitted by the processor 680 via an RF circuit 610 to another mobile phone for example, or, the audio data is output to the memory 620 for further processing.

Wi-Fi belongs to a short-range wireless transmission technology. With aid of the Wi-Fi module 670, the mobile phone may assist the user in E-mail receiving and sending, webpage browsing, access to streaming media and the like. Wi-Fi provides users with wireless broadband Internet access. Although the Wi-Fi module 670 is illustrated in FIG. 6, it should be understood that the Wi-Fi module 670 is not essential to the mobile phone and can be omitted according to actual needs without departing from the essential nature of the present disclosure.

The processor 680 is a control center of the mobile phone. The processor 680 is configured to use various interfaces and lines to connect various parts of the whole mobile phone, run or execute software programs and/or modules stored in the memory 620, and call data stored in the memory 620 to perform various functions of the mobile phone and process data, thereby monitoring the mobile phone. In at least one implementation, the processor 680 may include one or more processing units; for example, the processor 680 may be integrated with an application processor and a modem processor, where the application processor mainly handles the operating system, the user interface, the application, and so on, and the modem processor mainly processes wireless communication. It will be appreciated that the above-mentioned modem processor may not be integrated into the processor 680.

The mobile phone also includes a power supply 690 (e.g., a battery) that supplies power to various components. For instance, the power supply 690 may be logically connected to the processor 680 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 1 to FIG. 3 can be realized based on the structure of the mobile phone.

The functions of the units illustrated in FIG. 4 can be achieved based on the structure of the mobile phone.

Implementations of the present disclosure also provide a computer readable storage medium. The computer readable storage medium stores a computer program for electronic data interchange which, when executed, is operable with a computer to accomplish all or part of the operations of any of the methods described in the above-described method implementation. The computer can be a mobile terminal or other equipment.

Implementations of the present disclosure also provide a computer program product. The computer program product includes a non-transitory computer readable storage medium storing computer programs. The computer programs are operable with a computer to perform all or part of the operations of any of the methods described in the above method implementations. The computer program product may be a software installation package. The computer can be a mobile terminal or other equipment.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for application display on a mobile device, comprising:
   determining at least one high-frequency application, wherein the high-frequency application is an application software designed to run on the mobile device that matches a current position and a current time and has a usage frequency greater than a preset frequency threshold; and
   displaying, on a lock-screen interface of the mobile device, an application icon of the at least one high-frequency application;
   wherein when the at least one high-frequency application is one high-frequency application, displaying, on the lock-screen interface, the application icon of the at least one high-frequency application comprises:

displaying on the lock-screen interface a first application icon and a second application icon that are both related to the high-frequency application, wherein the first application icon and the second application icon are displayed at the same time and are configured to accept inputs, wherein when operated, the first application icon is configured to launch the high-frequency application and the second application is configured to display a display interface in a screen-off state, wherein the display interface in the screen-off state is a system desktop or an interface of an application;

detecting a selection operation against the first application icon and the second application icon within a preset time period; and performing one of:

exiting the lock-screen interface and displaying an application interface of the high-frequency application after an authentication for unlocking is successful, based on a determination that the selection operation against the first application icon is detected, or no selection operation against the first application icon or the second application icon is detected; or exiting the lock-screen interface and displaying the display interface in the screen-off state after the authentication for unlocking is successful, based on a determination that the selection operation against the second application icon is detected.

2. The method of claim 1, wherein the first application icon has display parameters different from display parameters of the second application icon.

3. The method of claim 1, wherein the first application icon and the second application icon of the high-frequency application are displayed transparently.

4. The method of claim 1, wherein when the at least one high-frequency application is a plurality of high-frequency applications, the displaying, on the lock-screen interface of the mobile device, the application icon of the at least one high-frequency application comprises:

determining a display parameter of each of the plurality of high-frequency applications according to a usage parameter of each of the plurality of high-frequency applications; and displaying, on the lock-screen interface, application icons of the plurality of high-frequency applications differentially, according to the display parameter of each of the plurality of high-frequency applications.

5. The method of claim 4, further comprising:

after the displaying, on the lock-screen interface, the application icons of the plurality of high-frequency applications, detecting selection operations against the plurality of high-frequency applications within a preset time period; and performing one of:

exiting the lock-screen interface and displaying, in split-screen, application interfaces of at least two high-frequency applications among the plurality of high-frequency applications after an authentication for unlocking is successful, based on a determination that the selection operations against the at least two high-frequency applications are detected; and exiting the lock-screen interface and displaying a display interface in a screen-off state after the authentication for unlocking is successful, based on a determination that no selection operation against the plurality of high-frequency applications is detected.

6. The method of claim 1, wherein the determining the at least one high-frequency application comprises:

obtaining a plurality of application usage records, wherein each application usage record corresponds to an application that is first enabled after unlocking successfully; and determining, from the plurality of application usage records, at least one application with a usage frequency higher than a preset threshold to be the at least one high-frequency application.

7. A device for application display, comprising:

a processor; and a communication unit coupled with the processor, wherein the processor is configured to:

determine at least one high-frequency application, wherein the high-frequency application is an application software designed to run on the device that matches a current position and a current time and has a usage frequency greater than a preset frequency threshold; and display, on a lock-screen interface, an application icon of the at least one high-frequency application via the communication unit;

wherein when the at least one high-frequency application is a plurality of high-frequency applications, the processor configured to display, on the lock-screen interface, the application icon of the at least one high-frequency application via the communication unit is further configured to:

determine a display parameter of each of the plurality of high-frequency applications according to a usage parameter of each of the plurality of high-frequency applications, wherein the display parameter comprises at least one of a size of the application icon, a color depth of the application icon, a width of application icon edges, or a shape of the application icon; and display, on the lock-screen interface, application icons corresponding to the plurality of high-frequency applications differentially via the communication unit, according to the display parameter of each of the plurality of high-frequency applications;

after displaying, on the lock-screen interface, the application icons corresponding to the plurality of high-frequency applications differentially via the communication unit, detect selection operations against the application icons within a preset time period; and perform one of:

exit the lock-screen interface and displaying in split-screen, via the communication unit, application interfaces of at least two high-frequency applications among the plurality of high-frequency applications after an authentication for unlocking is successful, based on a determination that selection operations against application icons correspond to the at least two high-frequency applications are detected; or exit the lock-screen interface and displaying, via the communication unit, a display interface in a screen-off state after the authentication for unlocking is successful, based on a determination that no selection operation against application icons correspond to the plurality of high-frequency applications is detected.

8. The device of claim 7, wherein the at least one high-frequency application is one high-frequency application, the processor configured to display, on the lock-screen interface, the application icon of the at least one high-frequency application via the communication unit is further configured to:

display, on the lock-screen interface, a first application icon and a second application icon of the high-frequency application via the communication unit, wherein the first application icon has display parameters different from display parameters of the second application icon.

9. The device of claim 8, wherein the processor is further configured to:

after displaying, on the lock-screen interface, the application icon of the at least one high-frequency application via the communication unit, detect a selection operation against the first application icon and the second application icon within a preset time period;

exit the lock-screen interface and displaying, via the communication unit, an application interface of the high-frequency application after an authentication for unlocking is successful, based on a determination that the selection operation against the first application icon is detected or no selection operation against the first application icon and the second application icon is detected; and exit the lock-screen interface and displaying, via the communication unit, a display interface in a screen-off state after the authentication for unlocking is successful, based on a determination that the selection operation against the second application icon is detected.

10. The device of claim 7, wherein when the at least one high-frequency application comprises one high-frequency application, the processor configured to display, on the lock-screen interface, the application icon of the at least one high-frequency application via the communication unit is further configured to:

display, on the lock-screen interface transparently, the application icon of the at least one high-frequency application via the communication unit.

11. The device of claim 7, wherein the processor configured to determine the at least one high-frequency application is configured to:

obtain a plurality of application usage records via the communication unit, wherein each application usage record corresponds to an application that is first enabled after unlocking successfully; and determine, from the plurality of application usage records, at least one application with a usage frequency higher than a preset threshold to be the at least one high-frequency application.

12. A non-transitory computer readable storage medium, configured to store computer programs for electronic data interchange, the computer programs operable with a computer to:

determine a high-frequency application, wherein the high-frequency application is an application software designed to run on a device that matches a current position and a current time and has a usage frequency greater than a preset frequency threshold; and display, on a lock-screen interface, a first application icon and a second application icon that are both related to the high-frequency application, wherein the first application icon and the second application icon are displayed at the same time and are configured to accept inputs, wherein when operated, the first application icon is configured to launch the high-frequency application and the second application icon is configured to display a display interface in a screen-off state, wherein the display interface in the screen-off state is a system desktop or an interface of an application;

detect a selection operation against the first application icon and the second application icon within a preset time period; and perform one of:

the lock-screen interface and displaying an application interface of the high-frequency application after an authentication for unlocking is successful, based on a determination that the selection operation against the first application icon is detected, or no selection operation against the first application icon or the second application icon is detected; or the lock-screen interface and displaying the display interface in the screen-off state after the authentication for unlocking is successful, based on a determination that the selection operation against the second application icon is detected.

13. The non-transitory computer readable storage medium of claim 12, wherein the first application icon has display parameters different from display parameters of the second application icon.

14. The non-transitory computer readable storage medium of claim 12, wherein the computer configured to determine the high-frequency application is configured to:

obtain a plurality of application usage records, wherein each application usage record corresponds to an application that is first enabled after unlocking successfully; and determine, from the plurality of application usage records, at least one application with a usage frequency higher than a preset threshold to be high-frequency application.

15. The non-transitory computer readable storage medium of claim 12, wherein the first application icon and the second application icon of the high-frequency application are displayed transparently.

\* \* \* \* \*